United States Patent [19]

Balmer

[11] Patent Number: 4,569,486

[45] Date of Patent: Feb. 11, 1986

[54] PNEUMATIC DISTRIBUTING DEVICE

[76] Inventor: Charles Balmer, P.O. Box 34, Elie, Manitoba, Canada, R0H 0H0

[21] Appl. No.: 574,860

[22] Filed: Jan. 30, 1984

[30] Foreign Application Priority Data

Feb. 4, 1983 [GB] United Kingdom ............... 8303059

[51] Int. Cl.$^4$ .................... A01C 15/04; B05B 1/20
[52] U.S. Cl. ................... 239/655; 239/166; 239/167; 239/168; 239/522; 239/523
[58] Field of Search ............ 239/167, 654, 655, 500, 239/522, 523, 166, 168; 222/617, 630, 637

[56] References Cited

U.S. PATENT DOCUMENTS

| | | | |
|---|---|---|---|
| 3,369,754 | 2/1968 | Wolford | 239/654 X |
| 4,020,991 | 5/1977 | Dreyer | 239/167 X |
| 4,296,695 | 10/1981 | Quanbeck | 239/655 X |
| 4,529,104 | 7/1985 | Tyler | 222/630 X |

FOREIGN PATENT DOCUMENTS

| | | | |
|---|---|---|---|
| 451437 | 4/1913 | France | 239/654 |
| 1435176 | 5/1976 | United Kingdom | 239/655 |
| 293568 | 3/1971 | U.S.S.R. | 239/654 |

Primary Examiner—Andres Kashnikow
Assistant Examiner—Mary Beth O. Jones
Attorney, Agent, or Firm—Stanley G. Ade; Adrian D. Battison

[57] ABSTRACT

A pneumatic distributing device which can be used for broadcasting particulate fertilizer, herbicide or the like includes a tank, a slot across the tank with a metering roller in the slot for metering the particulate material into a number of receptacles arranged along the slot. A first venturi at the bottom of the receptacle transports the material in the receptacle through a first portion of the duct to a junction provided by a second venturi and a second duct. The second duct extends outwardly along a boom with a number of such ducts arranged in a vertically stacked arrangement which is selfsupporting. The second ducts incline slightly downwardly and are straight from the feed end to an open mouth at the outer end. A deflector attached to the open mouth has a first and then a second surface for spreading and then deflecting the material from the open mouth to the ground with the spread taking place along the length of the boom.

14 Claims, 9 Drawing Figures

PNEUMATIC DISTRIBUTING DEVICE

BACKGROUND OF THE INVENTION

This invention relates to new and useful improvements in a pneumatic distributing device and particularly though not exclusively to such devices which are adapted to distribute granular or particulate material such as fertilizer, herbicide or seeds which can be broadcast over the ground or which can be applied to the soil using a cultivator or similar ground working device.

Various forms of broadcasting devices for fertilizer or herbicide are known. These can comprise structures for mounting on a vehicle or can comprise for example a pull-type vehicle with booms which extend to either side of the vehicle which can be extremely wide and may extend up to sixty or eighty feet in width.

In one arrangement the material to be distributed is carried in a tank on the vehicle with a slot transversely of the vehicle through which the material can be discharged from the tank. The metering roller is then positioned in the slot for metering a curtain of the material which is dropped into a plurality of receptacles arranged along the length of the roller. The metered material from the receptacle is then transported pneumatically through tubes or ducts to spaced positions along the length of the booms extending on either side of the vehicle. The material is injected into the tube or duct from the receptacle using a venturi supplied with air from a fan on the vehicle. The tubes extend from the venturi and are confined to curve through the necessary changes of direction to the required position on the boom.

One problem which has caused considerable difficulty is that of supporting the booms on either side of the vehicle and for this purpose the booms are usually provided with one or more ground engaging wheel. This arrangement is unsatisfactory in that uneven ground can cause considerable deflection of the boom which not only strains the supporting structure but can also interfere with the even distribution of the fertilizer over the ground in view of the changing height of the boom from the ground.

A further problem which arises in arrangements of this type is that of maximizing the amount of material which can be carried or transported from the receptacles to the distribution points on the booms and at the same time minimizing the amount of air used to reduce the amount of power employed. It will be appreciated in this regard that if the amount of material transported in the airstream through tubes exceeds a predetermined maximum then the material can collect at various points in the tubes thus blocking off the system and halting proper distribution of the material.

SUMMARY OF THE INVENTION

It is one object of the present invention to provide an improved pneumatic distribution device of this type which can increase the capacity of material transported and which provides proper distribution over the ground of the transported material.

According to a first aspect of the invention, therefore, there is provided an apparatus for pneumatically distributing particulate material comprising a tank for receiving the material to be distributed, means defining an elongate opening in the tank for discharging the material, means for metering the material discharged through the opening, a plurality of receptacles spaced along the length of the opening each for receiving a metered amount of the material, and duct means for transporting the metered material from each receptacle for distribution, each said duct means including a first substantially straight duct section leading from said receptacle, a second substantially straight duct section directly connected to the first at an angle relative thereto without any intervening curved section and means for injecting air into said second section to transport said material from the end of the first section for distribution.

According to a second aspect of the invention there is provided a device for pneumatically broadcasting particulate material comprising a straight duct section having an open mouth at one end thereof, means for developing an airstream through said duct section so that the particulate material is transported therethrough to the open mouth and a nozzle for deflecting material exiting from the mouth, the nozzle comprising a first surface having one end at one side of and parallel to the duct section at the open mouth thereof, the first surface being substantially flat in a direction transverse to the open mouth and having in that direction a width at least equal to the open mouth and in direction parallel to the duct section is curved so that the other end of the surface lies transverse to the open mouth to spread across the first surface and to direct to one side of the duct all material issuing from the open mouth, and a second surface separate from the first, transverse thereto and inclined relative to a plane at right angles to the end of the first surface such that one side of the first surface is spaced further from the second surface than is the other side whereby material issuing from the first surface is deflected by the second surface to a different angle depending upon its location on the first surface.

It is one advantage of the invention, therefore, that the material can be transported from the receptacle to an open mouth of the second section of the duct without encountering any curved duct sections. This increases the amount of material which can be transported using a particular duct size and airflow volume. It also reduces wear in the ducts caused by contact of the material with the duct walls and ensures that the material is effectively transported centrally of the duct along the fastest moving section of the airstream.

It is a further advantage of the invention that the material is properly distributed by the nozzle over the ground in a direction along the length of the second duct section. The turning of the material at the end of the second ducts section is obtained in a way which spreads it over a first surface and then uses a second surface which is angled so that material from different edges of the spread is directed in different directions relative to the ground. This obtains a much more even spread of the material rather than merely impacting an effectively linear stream of the material against the surface which randomly spreads the material.

According to a third aspect of the invention there is provided an apparatus for pneumatically distributing particulate material comprising a tank for receiving the material to be distributed, an elongate opening in the tank for discharging the material, means for metering the material discharged through the opening, a plurality of receptacles spaced along the length of the opening each for receiving a metered amount of material and duct means for transporting the metered material from each receptacle for distribution, each said duct means including a duct section extending from a position adjacent the tank to a position spaced outwardly of the tank such that some of the duct sections extend out to one side of the tank and some of the duct sections out to the opposite side thereof and means mounting the duct sections on each side in a vertically stacked coplanar arrangement, the support for said duct sections at the end thereof outwardly of said tank being provided solely by the duct sections themselves.

It is a yet further advantage of the invention therefore that the straight duct sections leading from the venturi adjacent the tank to the spreader nozzles at the remote end are self-supporting in a vertically stacked arrangement. This reduces the weight and complexity of the equipment. As the nozzle or deflector can be directly attached to the end of the duct, there is no need for any framework supporting the remote end of the ducts.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
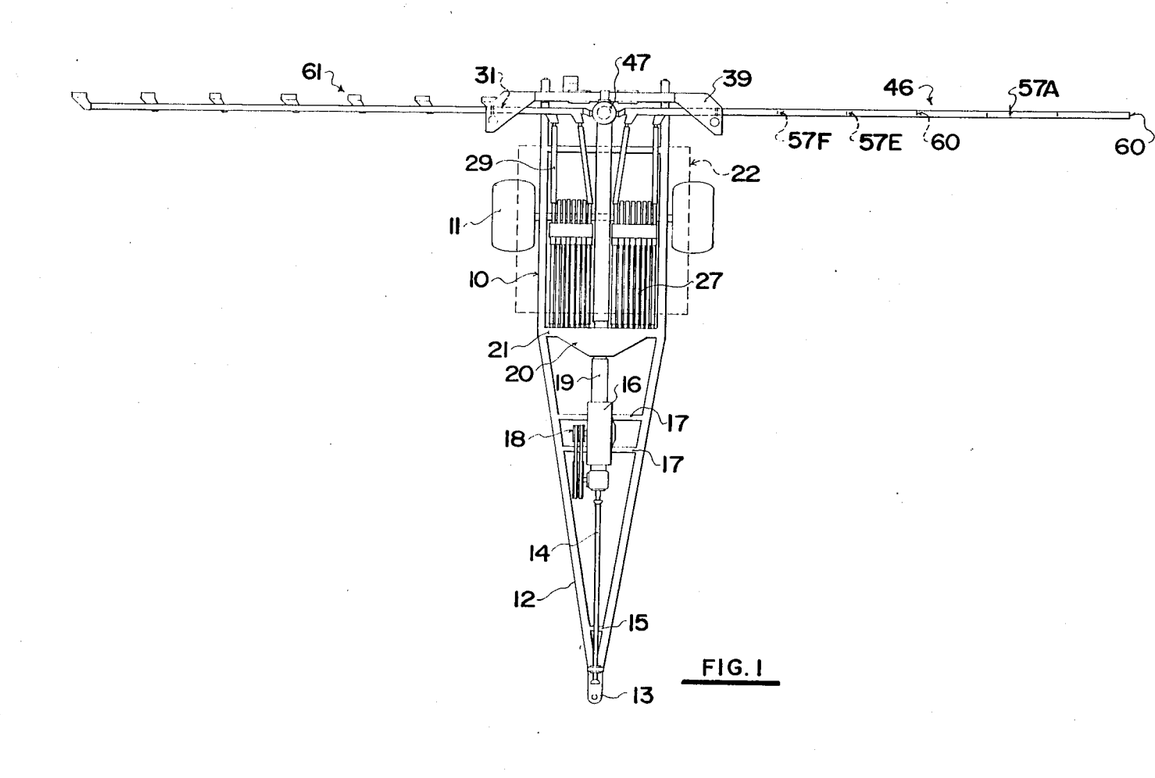
FIG. 1 is a top plan view of the device shown in the form of a pull-type assembly.

Proceeding therefore to describe the invention in detail, reference should first be made to FIG. 1 which shows a main chassis 10 mounted upon ground engaging wheels 11 and having a forwardly extending hitch assembly 12 terminating in a hitch member 13 for attachment to a towing source such as a tractor (not illustrated).

The power take-off shaft from the tractor is connected to drive shaft 14 supported within bearing assemblies 15 within the hitch assembly 12 which also supports a fan component 16 upon member 17 driven from the power take-off drive shaft 14 via pulley and belt assembly and gear box 18, all of which is conventional.

The fan assembly 16 is connected via the discharge conduit 19, to a horizontally extending manifold 20 supported upon the front chassis member 21 which forms part of the substantially rectangular chassis assembly 10 mounted upon the aforementioned wheels 11.

A transversely extending granular fertilizer box or tank 22 is supported across the chassis 10 by conventional means (not illustrated) and is provided on the underside thereof with a conventional transversely extending metering assembly collectively designated 23 which is rotated in a conventional manner from the ground engaging wheels 11 and is provided with an elongate metering roller 24 upon a shaft 25 which meters granular fertilizer from a slot 241 in the box 22 into individual receptacles 26 situated below the roller 24. Flexible conduits 27 extend from individual outlets within the manifold 20, one each to each of the receptacles 26 and in this particular embodiment, there are eight such conduits upon each side of the central line of the box making a total of sixteen conduits in all.

A venturi assembly 28 including an orifice 281 is situated at the connection between the individual flexible hoses 27 and the intake ends of the receptacles 26 thus assisting in the pick-up of the granular fertilizer by the airstream as it passes through the receptacles 26.

A flexible hose or duct 29 is connected to the rear ends 30 of each of the receptacles 26 with these ducts extending rearwardly to individual boom connector ducts 31 situated one above the other in a vertically stacked arrangement within a boom support frame collectively designated 32.

Figure 2:
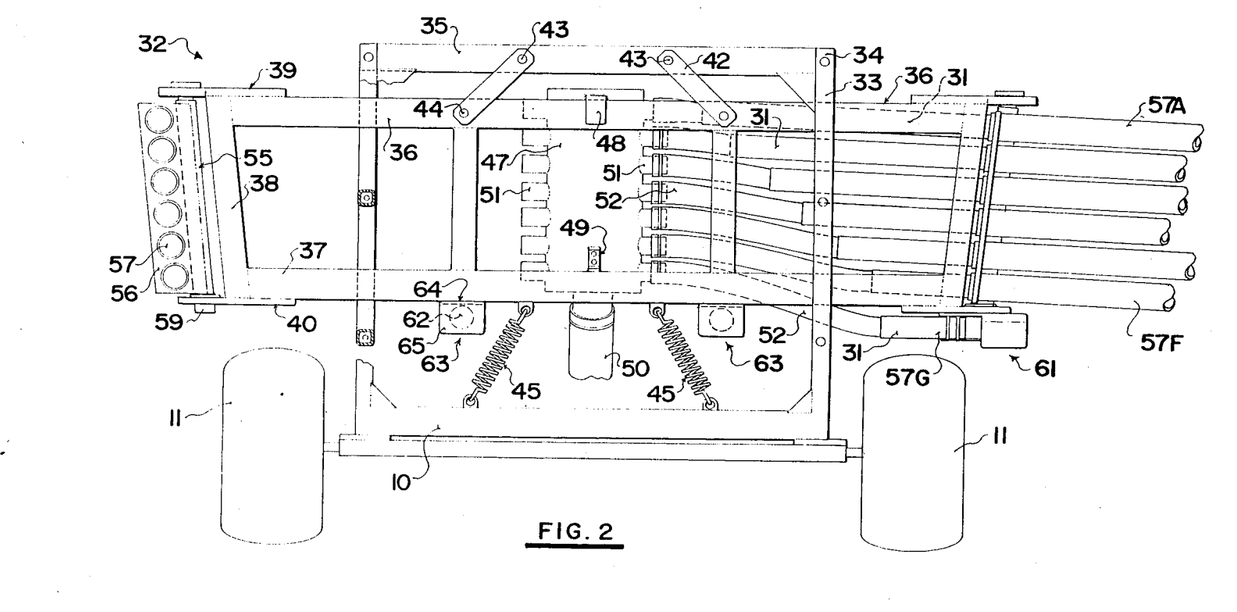
FIG. 2 is a fragmentary front elevation of the boom support frame with part of one boom shown in the field position.

The boom support frame is shown in detail in FIG. 2. FIG. 2 shows the rear portion 33 of the support framework or chassis consisting of vertical members 34 and a transverse member 35 extending between the upper ends of the vertical member 34 with suitable bracing (not illustrated) being provided.

The boom support frame 32 includes an upper transverse beam member 36 and a lower transverse beam member 37 with suitably vertical beams 38 extending between the ends thereof to form a substantially rectangular frame with the beams 38 inclining slightly downwardly and inwardly relative to the members 36 and 37. Anchor plates 39 are welded to the upper sides of the ends of the beam 36 and extend outwardly and are also welded to the upper ends of the beam 38.

Further anchor plates 40 are welded to the lower ends of beams 38 which extend below beam 37 with gusset plates welded between the inner ends of plates 40 and the underside of the beam 37 to provide rigidity to the structure.

This beam support frame 37 is suspended from the cross member 35 by outwardly and downwardly extending links 42 pivoted to the member 35 by pivots 43 and to the upper beam 36, by means of pivots 44. Reference to FIG. 2 will show that the links 42 incline downwardly and outwardly, one upon each side of the vertical center lines thus suspending the beam support frame and allowing it to centralize, within limits, regardless of the attitude of the chassis. If desired, check springs 45 may extend between adjacent the lower ends of the vertical members 33 and the lower beam member 37 of the beam support frame 32.

A boom assembly collectively designated 46 is pivotally secured between the pairs of plates 39 and 40 upon each side of the central beam support frame 32 and details of this mounting will hereinafter be described.

A vertically situated centrally located air manifold 47 is mounted centrally of the boom support frame 32 by means of an upper hook element 48 engaging over the upper frame member 36 and a lower attaching bracket 49 extending between the lower end of the manifold and the lower frame member 37.

A main flexible air hose or conduit 50 is operatively connected to the fan component 16 and extends to the base of this second manifold 47 and a plurality of outlets 51 extend upon each side of the manifold to which are connected flexible hoses 52 which connect to the individual boom connector ducts 31 which extend to adjacent the vertical member 38 of the boom support frame 37 being supported upon an apertured vertical plate 53 secured to and extending forwardly of the members 38.

Figure 6:
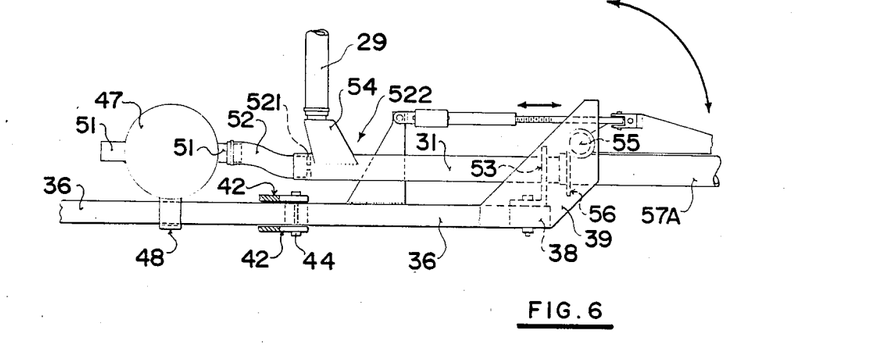
FIG. 6 is a partial top plan view of the device of FIG. 1 showing the connection between one of the first and second duct sections.

The aforementioned fertilizer hoses or ducts 29 connect individually to the tubes 31 via intake nipples 54 extending at right angles to the tubes 51 adjacent the connection thereto of the flexible hoses 52 and the connection between the hoses 52 and the tubes 31 includes an orifice 521 forming a second venturi 522 (FIG. 6) to pick up the mixture of granular fertilizer and air entering the tubes 31 via the nipples 54.

Figure 3:
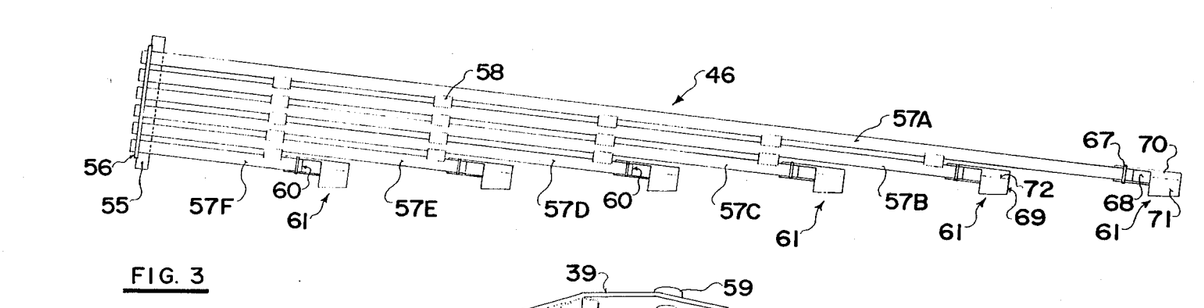
FIG. 3 is an end view of the boom support frame showing a boom secured thereto in the transport position.
Figure 3A:
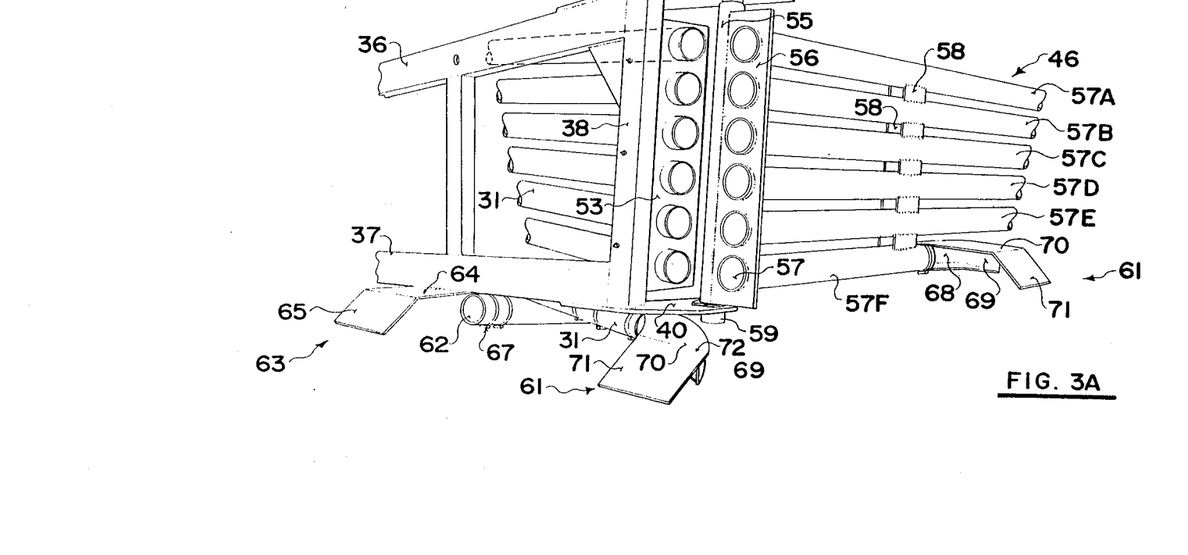
FIG. 3A is a fragmentary, isometric view of one of the booms in the transport position relative to the center section.
Figure 4:
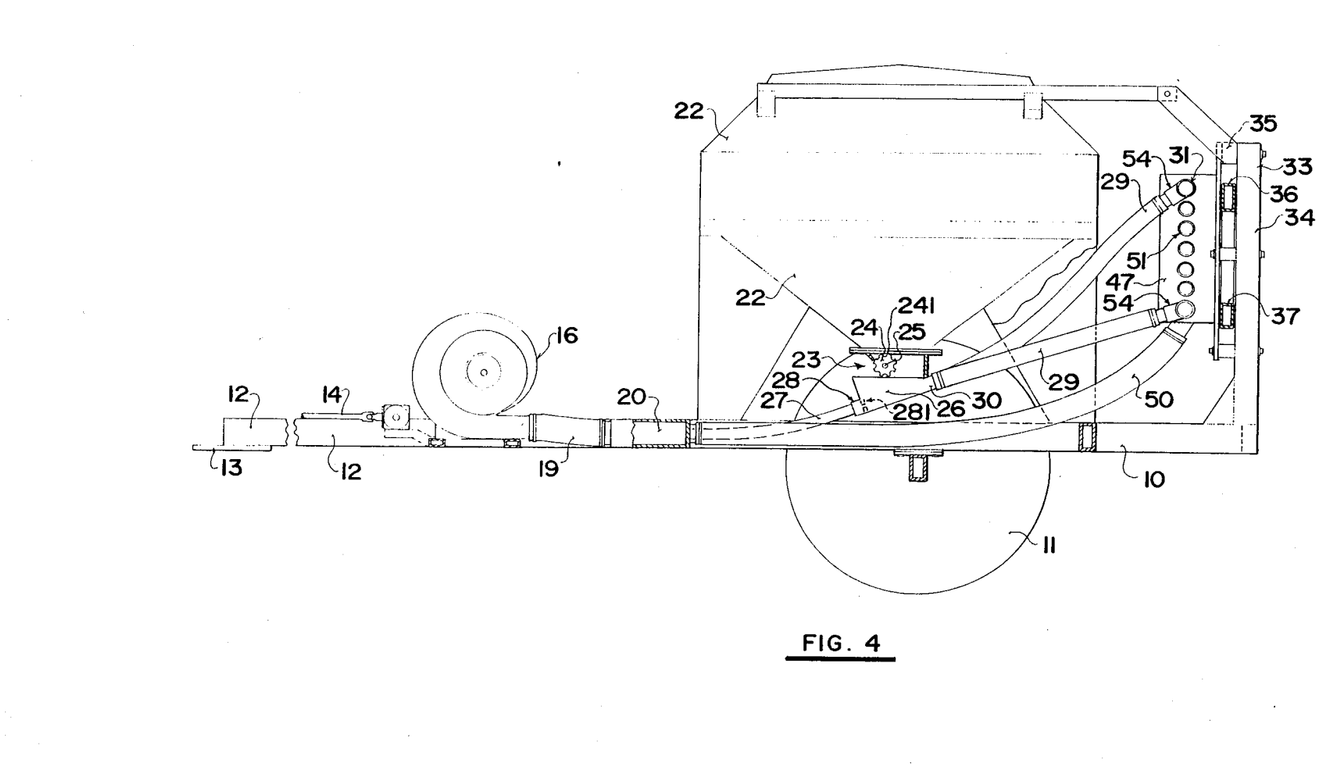
FIG. 4 is a side elevational view of the device of FIG. 1.

The boom components 46 consist of a vertical bearing pipe 55 to which is secured a vertical plate 56 extending on one side thereof as clearly shown in FIG. 3A and individual boom conduits 57 extend from the plate 56 which is apertured to receive the ends thereof and these ends are welded to the plate in vertical array as shown in FIGS. 3 and 3A.

The individual ducts 57 extend substantially horizontally from the plate in spaced and parallel relationship with one another in the vertically stacked arrangement with a plurality of spacers 58 being welded between adjacent ducts at spaced intervals therealong and particularly at the termination of each ducts 57 in turn. It will be noticed that the uppermost duct 57A is the longest and the lowermost duct 57G is the shortest with the remaining ducts 57B through 57F being gradually shorter in length as clearly illustrated in FIG. 3. This structure, which is relatively lightweight, is self-supporting and does not need additional supporting framework.

The vertical bearing pipe 55 pivotally engages over a spindle 59 which is secured between the offstanding ends of the aforementioned plates 39 and 40 thus mounting the boom assemblies 46, one upon each side of the boom supporting frame 36, for pivotal movement from a field position wherein the booms are in alignment one upon each side of the supporting frame 36 to a transport position where they are swung rearwardly towards the front of the supporting chassis 10 and vice versa. Conventional means (not illustrated) are provided to detachably lock the boom assemblies in the field or transport positions.

Reference to FIG. 3A will show the boom assembly 46 swung clear of the end of the central boom support frame with the inner ends of the tubes 31 extending beyond the plate 53 which supports same. When the boom component 46 is swung into the field position, these ends engage the ends 57A of the individual boom tubes or conduits and form effectively a continuous duct which provides the transmission of the granular fertilizer by the air streams passing therethrough.

The discharge ends 60 of the individual boom ducts comprise an open mouth coaxial with the straight duct and deflector assemblies collectively designated 61 are secured to these discharge ends and deflect the granular fertilizer downwardly in a fan formation thus giving the requisite coverage.

It should also be noted that there are seven individual boom tube components 57 illustrated on each side of the assembly, the eight flexible hose 29 of each set being connected directly to the lower beam 37 of the boom support frame 32 one upon each side of the vertically situated air manifold 47. These discharge ends of the hoses are identified by reference character 62 in FIG. 2 and they are held to the beam 37 by means of clips (not illustrated) and are provided with deflectors 63 which consist of a rearwardly extending horizontal plate 64 and a downwardly and angularly inclined plate 65 against which the fertilizer impinges and is sprayed downwardly therefrom in a fan configuration.

Figure 7:
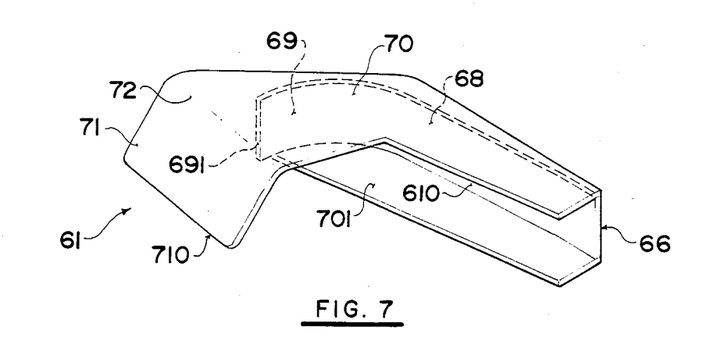
FIG. 7 is an isometric view of one of the deflector nozzles of FIG. 1.
Figure 8:
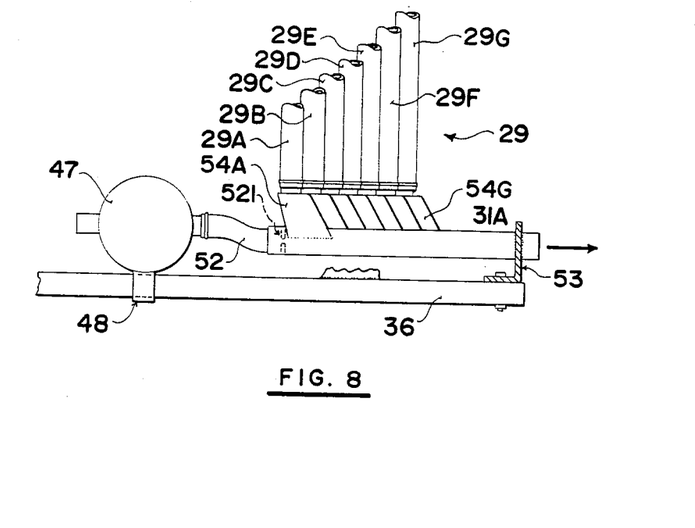
FIG. 8 is a partial top plan view similar to FIG. 6 showing all of the first duct sections but with some other parts omitted for clarity.

The deflectors 61 are shown in detail in FIG. 7. The deflector comprises a rear wall 610 which is basically flat in a direction transverse to the open mouth and includes an end portion 66 which can engage the end 60 of a duct 57 and can be clamped thereto by means of a hose clamp 67 or the like. The surface 610 remains flat in the direction transverse to the open mouth but curves in a direction along the length of the duct to form a curve 68 and an end wall 69. The latter extends transversely to the open mouth so that a projection from the open mouth is completely covered by the end wall 69. In addition side walls 70, 701 with a spacing equal to the width of the duct 57 are positioned at the top and bottom of the surface 610. Thus material ejected from the open mouth of the duct 57 enters into the chute formed by the surface 610 and the side walls 70, 701 and is confined thereby. The fact that the surface 610 is flat in a direction transverse to the open mouth causes the material to spread across the full width of the surface 610 as it turns the curved section 68. It thus leaves the end of the surface 69 as a curtain of material with a vertical spread along the edge indicated at 691.

An inclined surface 71 formed as a bent extension of the side wall 70 is then arranged transversely to the edge 691. A bend line 72 which is spaced from the upper end of the edge 691 provides an impact surface against which the material leaving the surface 69 contacts. The position of contact of the material on the surface 71 varies in dependence upon the position it leaves the edge 691. Thus material leaving the upper part of the edge 691 contacts the inclined surface 71 at a higher level that is closer to the edge 691 and conversely material leaving the bottom of the edge 691 travels a greater distance before contacting the surface 71. This orientation of the surface 71 causes the material to spread horizontally that is in a direction along the bottom edge 710 of the surface 71.

The deflector or nozzle 61 therefore takes material directly from the straight duct 57 and provides a turn through a first angle via the surface 610 and then a turn through a second angle downwardly via the surface 71. This eliminates the necessity for any curve at the end of the duct 57 and also provides an effective spread of the material in a horizontal direction parallel to the duct 57.

The deflectors 61, together with the lengths of the individual boom pipes or conduits 57, are such that a complete coverage is provided from one length of the assembly to the other including the center section which is covered by the two deflectors 63 mounted on the boom support frame 32. The various manifolds and venturis assist in the maintaining of the proper air speed in order to lever the granular fertilizer at the exit points.

Figure 5:
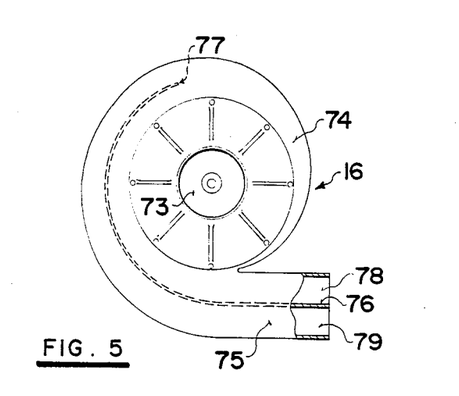
FIG. 5 is a cross sectional view of the main fan assembly of the device of FIG. 1.

As mentioned previously, the main air conduit 50 is operatively connected to the fan assembly 16. This may either be taken off from the front manifold 20 or alternatively, may utilize a specific form of fan construction illustrated schematically in FIG. 5. This is a centrifugal turbine type fan having an intake 73 provided in the center of the casing 74. The discharge 75 forms an extension of the periphery of the casing in the usual way and a transverse divider plate 76 is situated within the discharge and extends into the fan casing to a point indicated by reference character 77. This divides the discharge air into two streams with the percentage of air in the upper and lower chambers 77 and 78 being determined by the position of the inner end 77 of the divider. One chamber 77 may be connected to the manifold 20 and the other, connected directly to the main air conduit 50. This construction of the fan assembly may be utilized in other environments than the present one.

It will be noted that the duct leading from the receptacles 26 to the deflectors 61 instead of including a number of curves is provided by two effectively straight sections with a substantially right angle junction between the sections. The first section is provided by the flexible duct 29 and the second section is provided by the two part duct 31, 57. Any slight curves in the section 29 necessary in view of the different angles between the receptacle 26 and the various nipples 54 are not significant to the transport of the material in comparison with the right angle curves previously required in conventional arrangements. The venturi 522 can comprise the main venturi which transports the material in the airstream over the main portion of the length to the deflector nozzle 61. In this case the venturi provided by the orifice to 281 can be of very much less force in view of a substantially reduced airstream. The suction developed by the venturi 522 can therefore transport the material to the duct 29. In some cases where only a small amount of material is to be transported the venturi or orifice 281 can be omitted.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A device for pneumatically broadcasting particulate material comprising a straight duct section having an open mouth at one end thereof, means for developing an airstream through said duct section so that the particulate material is transported therethrough to the open mouth and a nozzle for deflecting material exiting from the mouth, the nozzle comprising a first surface having one end at one side of and parallel to the duct section at the open mouth thereof, the first surface being substantially flat in a direction transverse to the open mouth and having in that direction a width at least equal to the open mouth and in direction parallel to the duct section is curved so that the other end of the surface lies transverse to the open mouth to spread across the first surface and to direct to one side of the duct all material issuing from the open mouth, and a second surface separate from the first, transverse thereto and inclined relative to a plane at right angles to the end of the first surface such that one side of the first surface is spaced further from the second surface than is the other side whereby material issuing from the first surface is deflected by the second surface to a different angle depending upon its location on the first surface.

2. The invention according to claim 1 wherein there are provided side walls at right angles to and upstanding from the first surface to confine material issuing from the mouth, the spacing of the side walls being at least equal to the width of the mouth, and wherein one of said side walls includes an extension portion extending beyond the end of the first surface, said second surface being formed by a section of said side wall bent relative to said extension portion.

3. The invention according to claim 2 wherein a projection from the end of the first surface intersect the second surface intermediate the width of the second surface and substantially at right angles to the bend between said second surface and the extension portion.

4. Apparatus for distributing material for mounting on a vehicle of the type movable across the ground and having a tank for receiving the material to be distributed and means for metering and propelling the material for distribution, said apparatus comprising a boom assembly, means for mounting the boom assembly on the vehicle such that the boom assembly extends outwardly to one side of the vehicle, said boom assembly comprising a plurality of separate ducts each arranged to extend from an inner end at a position adjacent the vehicle for receiving said material to an outer end spaced outwardly of the vehicle for discharge of the material downwardly onto the ground, the length of the ducts being graduated such that the outer ends are spaced along the boom assembly for distribution of the material over the ground, each of said ducts comprising an elongate substantially rigid straight tube, means mounting the ducts such that they lie along their lengths in a vertically stacked coplanar relationship, means for supporting the ducts outwardly of said duct mounting means consisting solely of means interconnecting the ducts transversely to their length at spaced positions along the length thereof and the ducts themselves.

5. Apparatus according to claim 4 wherein each of the ducts is inclined downwardly from the inner end thereof toward the outer end thereof and such that the spaced outer ends of the ducts all terminate in a common horizontal plane.

6. Apparatus according to claim 4 wherein said interconnecting means connects all of the ducts together in said vertically stacked arrangement at the outer end of each duct.

7. Apparatus according to claim 4 including pivot mounting means mounting said boom assembly for common pivotal movement about a substantially vertical axis whereby said boom assembly can be pivoted from a position extending outwardly to one side of said vehicle to a position along side the vehicle.

8. Apparatus according to claim 7 including a plurality of boom connector ducts fixedly mounted in a vertically stacked coplanar relationship adjacent said pivot mounting means whereby each of said ducts of said boom assembly can cooperate with a respective boom connector duct in said working position for communication of said material and can be pivoted away from said boom connector duct in said position along side said vehicle.

9. Apparatus according to claim 4 wherein each duct has an open mouth at the outer end thereof and distribution nozzle means attached to said outer end for deflecting said material exiting from said outer end, the nozzle comprising a first surface having one end at one side of and parallel to the duct section at the open mouth thereof, the first surface being substantially flat in a direction transverse to the open mouth and having in that direction a width at least equal to the open mouth and in direction parallel to the duct section is curved so that the other end of the surface lies transverse to the open mouth to spread across the first surface and to direct to one side of the duct all material issuing from the open mouth, and a second surface separate from the first, transverse thereto and inclined relative to a plane at right angles to the end of the first surface such that one side of the first surface is spaced further from the second surface than is the other side whereby material issuing from the first surface is deflected by the second surface to a different angle depending upon its location on the first surface.

10. Apparatus for distributing material for mounting on a vehicle of the type movable across the ground and having a tank for receiving the material to be distributed and means for metering and propelling the material for distribution, said apparatus comprising a boom assembly, means for mounting the boom assembly on the vehicle such that the boom assembly extends outwardly to one side of the vehicle, said boom assembly comprising a plurality of separate ducts each arranged to extend from an inner end at a position adjacent the vehicle for receiving said material to an outer end spaced outwardly of the vehicle for discharge of the material downwardly onto the ground, the length of the ducts being graduated such that the outer ends are spaced along the boom assembly for distribution of the material over the ground, each of said ducts comprising an elongate substantially rigid straight tube, means mounting the ducts such that they lie along their lengths in a vertically stacked coplanar relationship, such that each of the ducts is inclined downwardly from the inner end thereof toward the outer end and such that the spaced outer ends of the ducts all terminate in a common horizontal plane.

11. Apparatus according to claim 10 further comprising means interconnecting the ducts transversely to their lengths at spaced positions along the length thereof, said interconnecting means connecting all of the ducts together in said vertically stacked arrangement at the outer end of each duct.

12. Apparatus according to claim 10 including pivot mounting means mounting said boom assembly for common pivotal movement about a substantially vertical axis whereby said boom assembly can be pivoted from a position extending outwardly to one side of said vehicle to a position along side the vehicle.

13. Apparatus according to claim 12 including a plurality of boom connector ducts fixedly mounted in a vertically stacked coplanar relationship adjacent said pivot mounting means whereby each of said ducts of said boom assembly can cooperate with a respective boom connector duct in said working position for communication of said material and can be pivoted away from said boom connector duct in in said position along side said vehicle.

14. Apparatus according to claim 10 wherein each duct has an open mouth at the outer end thereof and distribution nozzle means attached to said outer end for deflecting said material exiting from said outer end, the nozzle comprising a first surface having one end at one side of and parallel to the duct section at the open mouth thereof, the first surface being substantially flat in a direction transverse to the open mouth and having in that direction a width at least equal to the open mouth and in direction parallel to the duct section is curved so that the other end of the surface lies transverse to the open mouth to spread across the first surface and to direct to one side of the duct all material issuing from the open mouth, and a second surface separate from the first, transverse thereto and inclined relative to a plane at right angles to the end of the first surface such that one side of the first surface is spaced further from the second surface than is the other side whereby material issuing from the first surface is deflected by the second surface to a different angle depending upon its location on the first surface.

* * * * *